(12) United States Patent
Kodimer

(10) Patent No.: US 12,184,637 B2
(45) Date of Patent: Dec. 31, 2024

(54) SYSTEM AND METHOD FOR PIN AUTHENTICATION ISSUANCE FROM MFP QR CODE

(71) Applicant: Toshiba TEC Kabushiki Kaisha, Shinagawa-ku (JP)

(72) Inventor: Marianne Kodimer, Huntington Beach, CA (US)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 246 days.

(21) Appl. No.: 17/674,553

(22) Filed: Feb. 17, 2022

(65) Prior Publication Data

US 2023/0262048 A1    Aug. 17, 2023

(51) Int. Cl.
*H04L 9/40* (2022.01)
*G06K 7/10* (2006.01)
*G06K 7/14* (2006.01)

(52) U.S. Cl.
CPC ........ *H04L 63/083* (2013.01); *G06K 7/10722* (2013.01); *G06K 7/1417* (2013.01)

(58) Field of Classification Search
CPC ............. G06K 7/1417; G06K 7/10722; H04L 63/083; H04L 63/0853; H04L 63/18; G06F 21/34; G06F 21/42; G06F 21/608
See application file for complete search history.

(56) References Cited

U.S. PATENT DOCUMENTS

| | | | | |
|---|---|---|---|---|
| 2003/0187951 A1* | 10/2003 | Shen | ..................... | G06F 21/608 709/219 |
| 2004/0165211 A1* | 8/2004 | Herrmann | ............... | G06F 21/34 713/184 |
| 2007/0038872 A1* | 2/2007 | Bridges | ................. | G06F 21/608 713/193 |
| 2008/0195545 A1* | 8/2008 | Motoyama | .............. | G06F 21/43 705/51 |
| 2013/0222840 A1* | 8/2013 | Hosoda | ................ | H04N 1/0084 358/1.14 |
| 2013/0342865 A1* | 12/2013 | Shekher | ............... | G06K 15/005 358/1.14 |
| 2014/0230023 A1* | 8/2014 | Parks | ...................... | H04L 63/08 726/4 |
| 2014/0282991 A1* | 9/2014 | Watanabe | ............. | H04W 12/06 726/9 |
| 2016/0182762 A1* | 6/2016 | Eum | .................. | H04N 1/00307 358/1.14 |
| 2019/0050178 A1* | 2/2019 | Kook | .................... | H04L 63/083 |
| 2022/0239799 A1* | 7/2022 | Hosoda | .................. | G06F 21/32 |

* cited by examiner

*Primary Examiner* — Theodore C Parsons
(74) *Attorney, Agent, or Firm* — UB Greensfelder LLP

(57) ABSTRACT

A system and method for PIN authentication issuance from a MFP QR Code includes a QR code presented on an authentication screen of multifunction peripheral display. A user requiring a personal information number to access a multifunction peripheral printing system managed by a print server scans the QR code with their secure smartphone or tablet. The scanned QR code opens a web portal to the server on the user's device where they can select a new PIN. The new PIN is stored on the server for the user's account and access to the MFP is then granted when the user enters their new PIN.

16 Claims, 8 Drawing Sheets

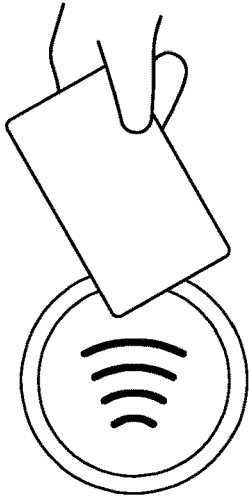
FIG. 4

SYSTEM AND METHOD FOR PIN AUTHENTICATION ISSUANCE FROM MFP QR CODE

TECHNICAL FIELD

This application relates generally to print management and accounting in a print network. The application relates more particularly to user selection and implementation of a personal information number (PIN) through their secure smartphone or tablet commenced by scanning a code displayed on a multifunction peripheral.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs are often shared by multiple users who must login to devices to use them.

BRIEF DESCRIPTION OF THE DRAWINGS

Various embodiments will become better understood with regard to the following description, appended claims and accompanying drawings wherein:

FIG. 4 is an enlarged view of an authentication screen depicted in FIG. 1;

DETAILED DESCRIPTION

Figure 1:
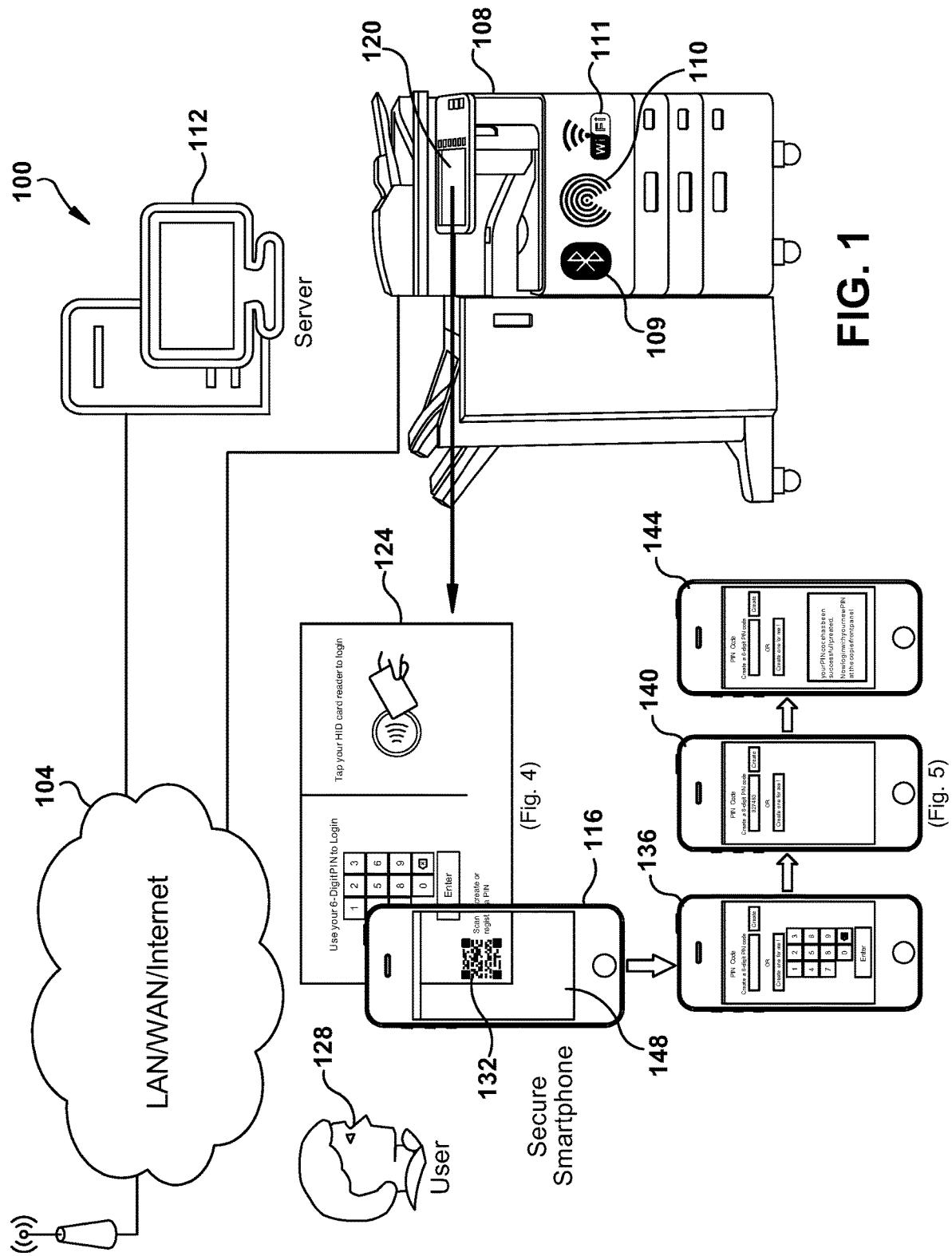
FIG. 1 an example embodiment of a system for PIN authentication issuance from a MFP QR Code.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

As noted above, MFPs are frequently shared among multiple users. Users must login to an MFP before they can use it. Login information allows for control of device features, job monitoring and job cost accounting. In environments with multiple, networked MFPs, management and accounting functions may be managed by one or more networked print servers. When a user logs in to an MFP, they are identified and their account information accessed in concert with the print server. Fees for MFP services may be debited from the user's prepaid account or charged to their credit card.

Print Management may be accomplished with a system such as PaperCut or SkyPrint. SkyPrint is used in example embodiments herein, however it is understood that any suitable networked print management system can be used. Example embodiments herein implement portable personal data devices, such as smartphones or tablet computers. While certain examples may include reference to smartphones, it is to be understood that any suitable personal data device can be used.

Currently, in applications such as SkyPrint, users must be preregistered on an administrative (admin) portal to use MFP functions. If a company is using PIN codes, the end user must register with the SkyPrint server, via web portal, to retrieve or create a PIN code. This PIN code must be created and registered before attempting to login to the MFP. Systems such as this require users to return to the admin portal from the MFP front panel to create or issue their PIN code which is inconvenient to an MFP walk-up user.

Example embodiments herein describe a system, including a user interface (UI) and workflow, wherein an MFP user can use an MFP-supplied login encoded image, such as QR code or barcode, displayed on the MFP's front panel to receive or create a new PIN code to be used at the MFP. While example embodiments herein refer to a QR code, it is to be understood that any scan-able indicia can be used. By scanning the QR code from the user's phone camera, a user's trusted device can invoke a SkyPrint web portal using phone/face login to gain secure PIN code issuance. As a result, the user experience is improved. A QR code is used to invoke a secure page from the user's secure and trusted mobile device instead of using the MFP to register with web portal page for PIN code issuance.

Companies' and or users' authentication profiles are often accessed via PIN numbers. A PIN number is used to authenticate one into an MFP and into an associated print management server such that tracking, and authentication onto other repositories (such as MS or Google Drive) can occur. Often times a user will not know their initial PIN, or they may have forgotten it. To remove friction to gain this information or create it, example embodiments herein describe a UI workflow where the user can initiate authentication issuance via QR code and their secure mobile device.

In example embodiments detailed herein, once the user has been registered with the print management system, a mobile version of the web portal is invoked by a QR code scan at the MFP front panel. Authentication is thereafter handled by the user's phone (password, thumb, facial recognition) thus opened to the correct page for PIN code issuance. The user can auto generate a code or create one himself. Once created, it is store in the server. The user is instructed and given feedback on the process, and once successfully created, instructed to login at the MFP. This system reduces friction associated with unknown, forgotten, or not yet created PIN authentication.

FIG. 1 illustrates an example embodiment of a. Included in FIG. 1 is network cloud 104 suitably comprised of a local area network (LAN), a wide area network (WAN), which may comprise the Internet, or any suitable combination thereof. Network cloud 104 is comprised of any suitable wireless or wired data connection or combination thereof. Network cloud 104 provides a data connection between MFP 108, network server 112, such as a SkyPrint server, and a portable personal data device illustrated as smartphone 116, but suitably comprised of any suitable device, such as a tablet computer. The user's device is identified with them and is secure, such as with a password, swipe pattern or biometric. MFP 108 includes a user interface, such as touchscreen 120 that displays an authentication screen 124 for user sign in, suitably via entry of a PIN code, for access to MFP functions. Further details relative to authentication screen 124 follow with reference to FIG. 4, below. MFP 108 also includes wireless data communication, such as via Bluetooth 109, RFID 110 and Wi-Fi 111. Authentication and job accounting is suitably accomplished via network server 112. In the illustrated example, user 128 does not have or does not recall their PIN. Authentication screen 124 displays an encoded indicia 132, suitably comprised of a barcode or QR code. A digital camera in smartphone 116 captures an image of encoded indicia 132 and the smartphone decodes it. The decoded QR code launches a web portal to network server 112 and facilitates a sequence of steps indicated by screens 136, 140 and 144 on a touchscreen display 148 on smartphone 116. Further details relative to this sequence follow with reference to FIG. 5, below.

Figure 2:
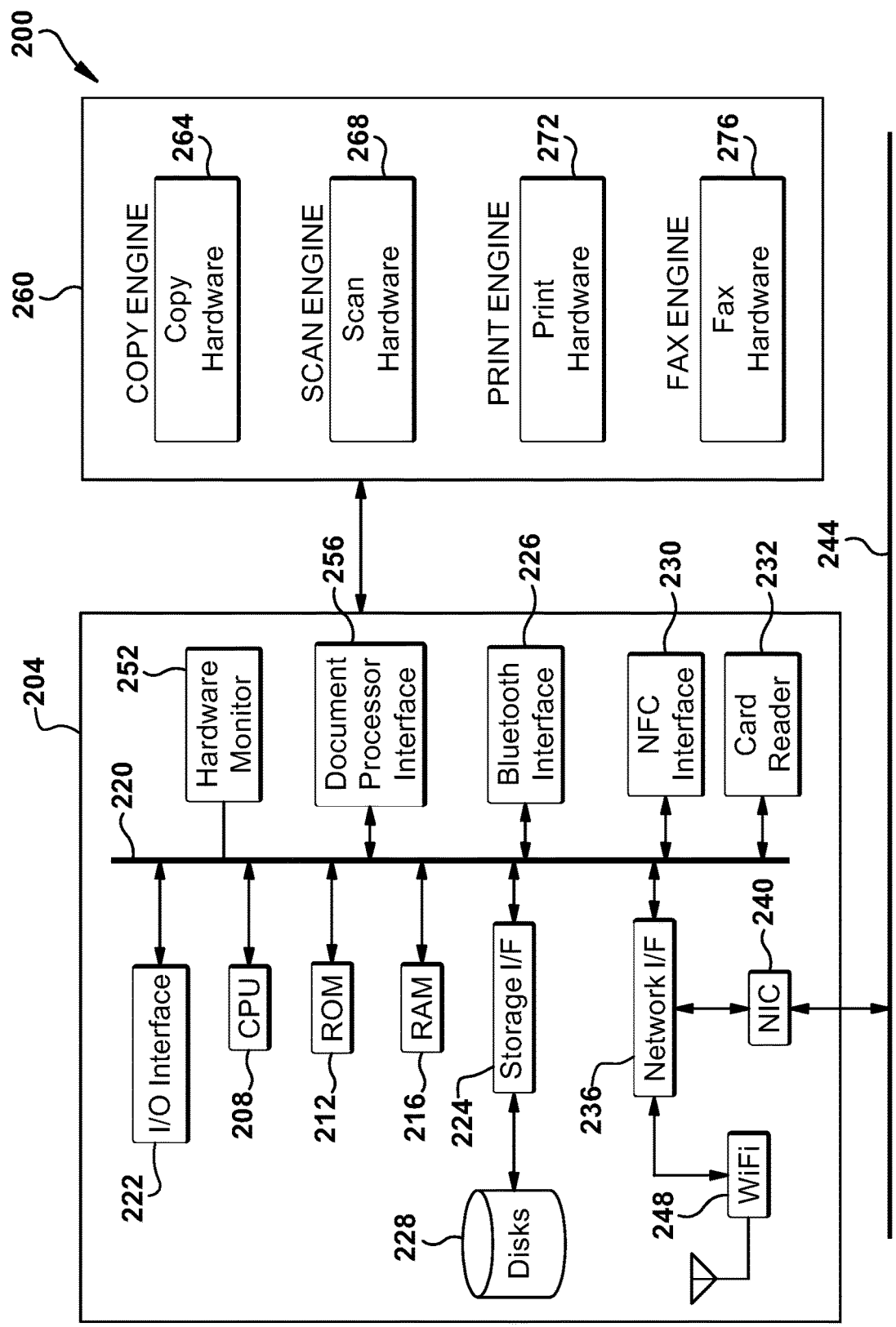
FIG. 2 is an example embodiment of a networked digital device, such as multifunction peripheral.

Turning now to FIG. 2, illustrated is an example embodiment of a networked digital device comprised of document rendering system 200 suitably comprised within an MFP, such as with MFP 108 of FIG. 1. It will be appreciated that an MFP includes an intelligent controller 204 which is itself a computer system. Thus, an MFP can itself function as a server with the capabilities described herein. Included in intelligent controller 204 are one or more processors, such as that illustrated by processor (CPU) 208. Each processor is suitably associated with non-volatile memory, such as read-only memory (ROM) 212, and random access memory (RAM) 216, via a data bus 220.

Processor 208 is also in data communication with input/output interface 222, suitably comprising a user touchscreen. While touchscreens are discussed in example embodiments herein, it is to be appreciated that any suitable user interface, such as keyboards, switches, displays, trackballs or mice may be used.

Processor 208 is also in data communication with a storage interface 224 for reading or writing to a storage 228, suitably comprised of a hard disk, optical disk, solid-state disk, cloud-based storage, or any other suitable data storage as will be appreciated by one of ordinary skill in the art.

Processor 208 is also in data communication with card reader 232 for data exchange with proximity cards, such as card keys.

Processor 208 is also in data communication with a network interface 236 which provides an interface to a network interface controller (NIC) 240, which in turn provides a data path to any suitable wired interface or physical network connection 244, or to a wireless data connection via wireless network interface 248. Example wireless data connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like.

Processor 208 can also be in data communication with any suitable user input/output (I/O) interface 222 which provides data communication for interfacing with user peripherals, such as displays, keyboards, mice, track balls, touch screens, or the like. Processor 208 can also be in communication with hardware monitor 252, such as a page counter, temperature sensor, toner or ink level sensor, paper level sensor, or the like.

Also in data communication with data bus 220 is a document processor interface 256 suitable for data communication with the document rendering system 260, including MFP functional units. In the illustrated example, these units include a scan engine comprising copy hardware 264, a scan engine comprise of scan hardware 268, a print engine comprised of print hardware 272 and a fax engine comprised of fax hardware 276 which together comprise MFP document rendering system 260. It will be understood that functional units are suitably comprised of intelligent units, including any suitable hardware or software platform.

Figure 3:
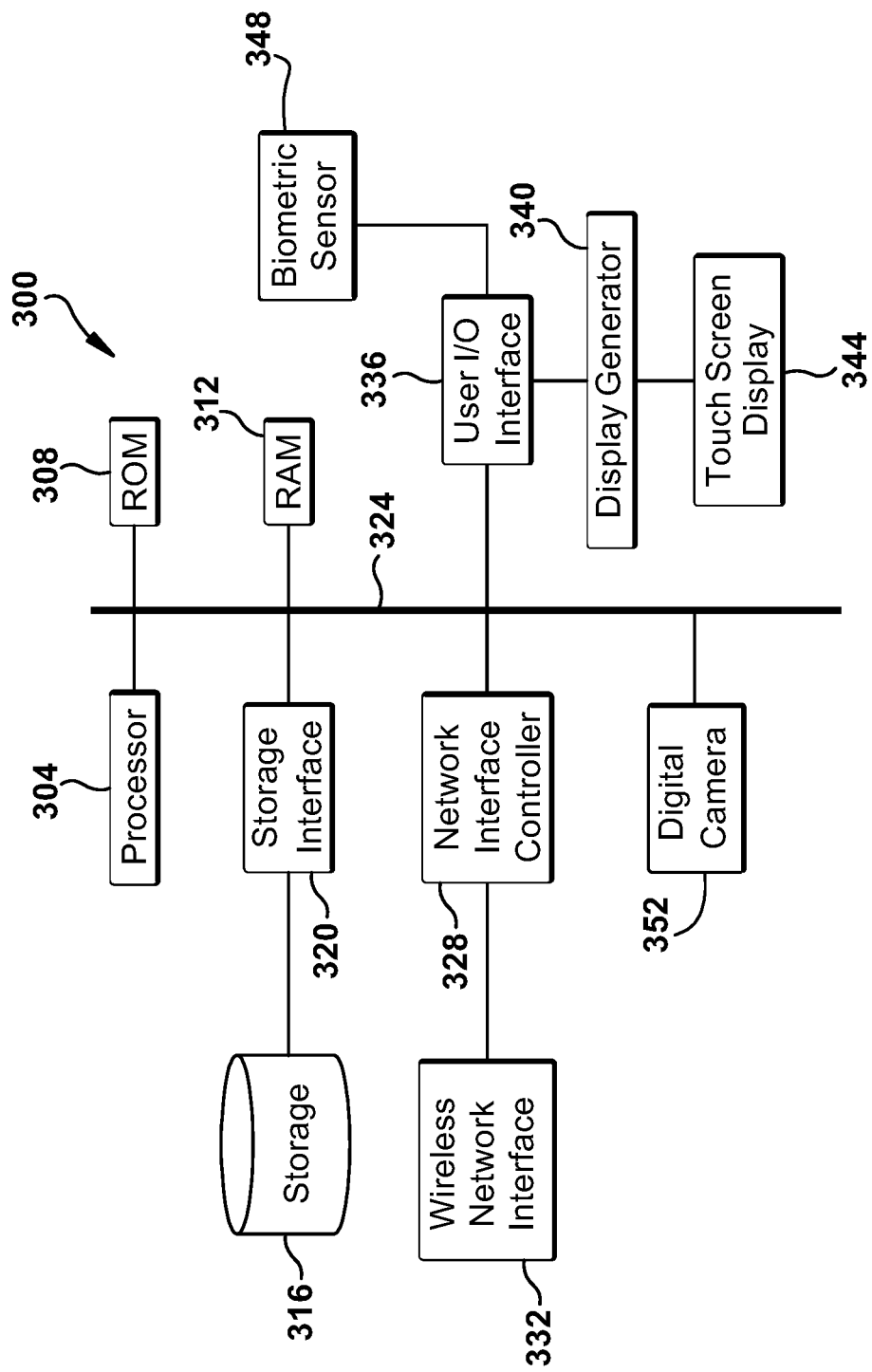
FIG. 3 is an example embodiment of a digital device system such as a smartphone or server.

Turning now to FIG. 3, illustrated is an example embodiment of a digital data processing device 300 such as network server 112 or smartphone 116 of FIG. 1. It is to be appreciated that some components listed may be unnecessary in certain configurations. Components of the digital data processing device 300 suitably include one or more processors, illustrated by processor 304, memory, suitably comprised of read-only memory 308 and random access memory 312, and bulk or other non-volatile storage 316, suitably connected via a storage interface 320. Data communication among components is accomplished via data bus 324. A network interface controller 328 suitably provides a gateway for data communication with other devices, via any wireless or wired connection, such as via wireless network interface 332. A user input/output interface 336 is suitably comprised of display generator 340 interfacing with touchscreen display 344. As noted above, any suitable user input and display can be used. User input/output interface 336 also provides connection to biometric sensor 348, suitably comprised of a fingerprint sensor, retinal sensor, or the like, and may be used to secure device access to one or more users. Processor 304 is also in data communication with a digital camera 352, suitably used to capture images which may include encoded images such as barcodes or QR codes. Digital camera 352 is also suitably used for facial recognition, including facial recognition for securing device access.

FIG. 4 is an enlarged view of authentication screen 124 of FIG. 1. The screen displays touchscreen keypad 400 for PIN code entry. Entry of a valid PIN code allows for identification of an identified, authorized user and facilitates access to MFP functionality. Identification is also suitably done with a proximity device such as a RFID card, a HID card, or any suitable card key that is brought in close proximity to authentication screen 124. Authentication is may also be done via alternatives such as Bluetooth or Wi-Fi direct. As noted above in connection with FIG. 1, authentication screen 124 displays encoded indicia 132 to secure a PIN for users when none is available to them.

Figure 5:
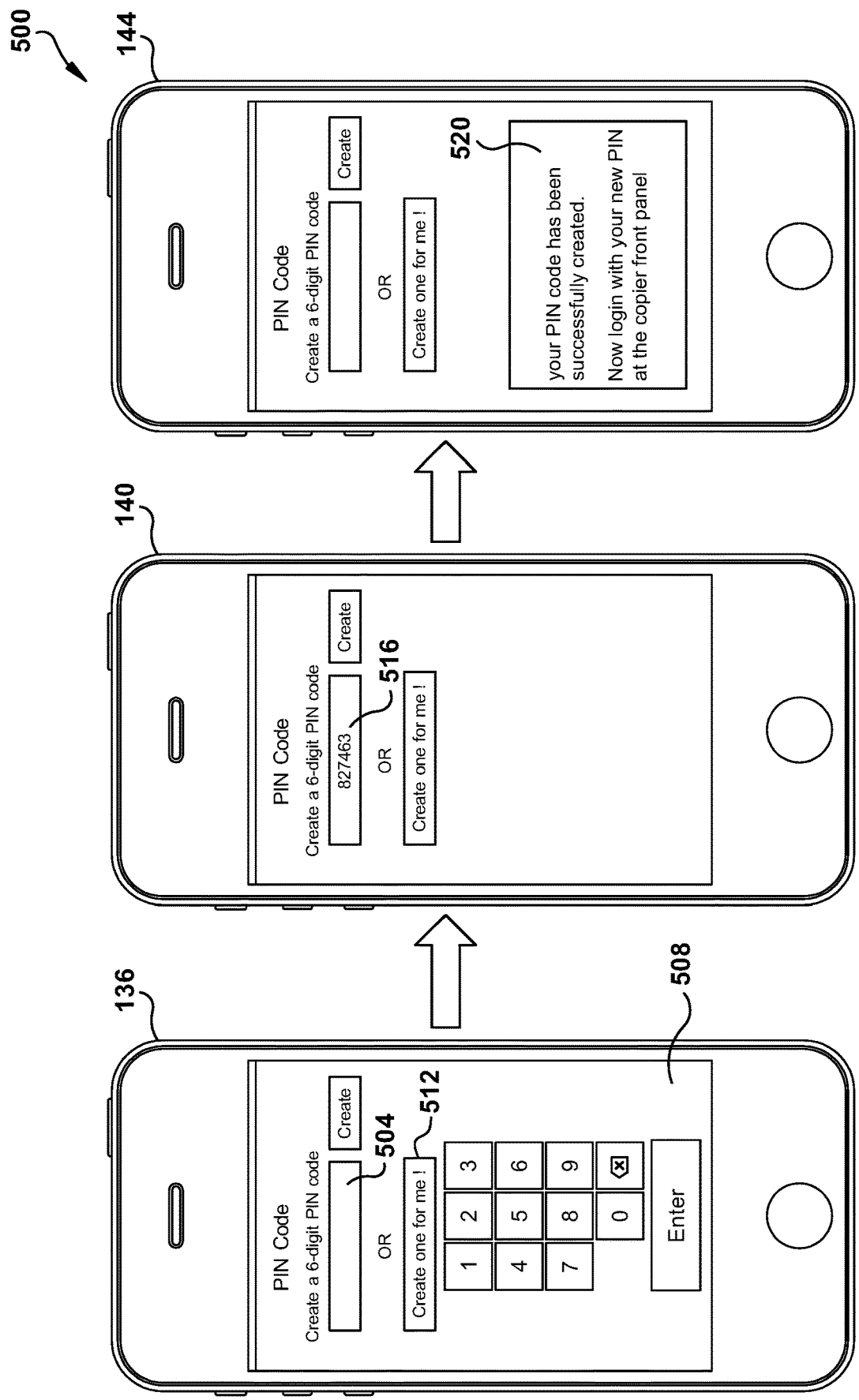
FIG. 5 is enlarged view of a screen sequence depicted in FIG. 1.

FIG. 5 is an enlarged view of sequence 500 comprised of screens 136, 140 and 144 on touchscreen display 148 of smartphone 116 of FIG. 1. Screen 136 is generated after QR code scanning. A portal is opened with the print server and a PIN selection window 504 is displayed. A PIN can be selected via soft keypad 508. Alternatively, a PIN can be automatically created when a user selects soft key 512. Screen 140 shows PIN selection 516 in PIN selection window 504. A newly created PIN created and use verification is provided at block 520 of screen 144. The PIN is then associated with the user and stored on the print server.

Figure 6:
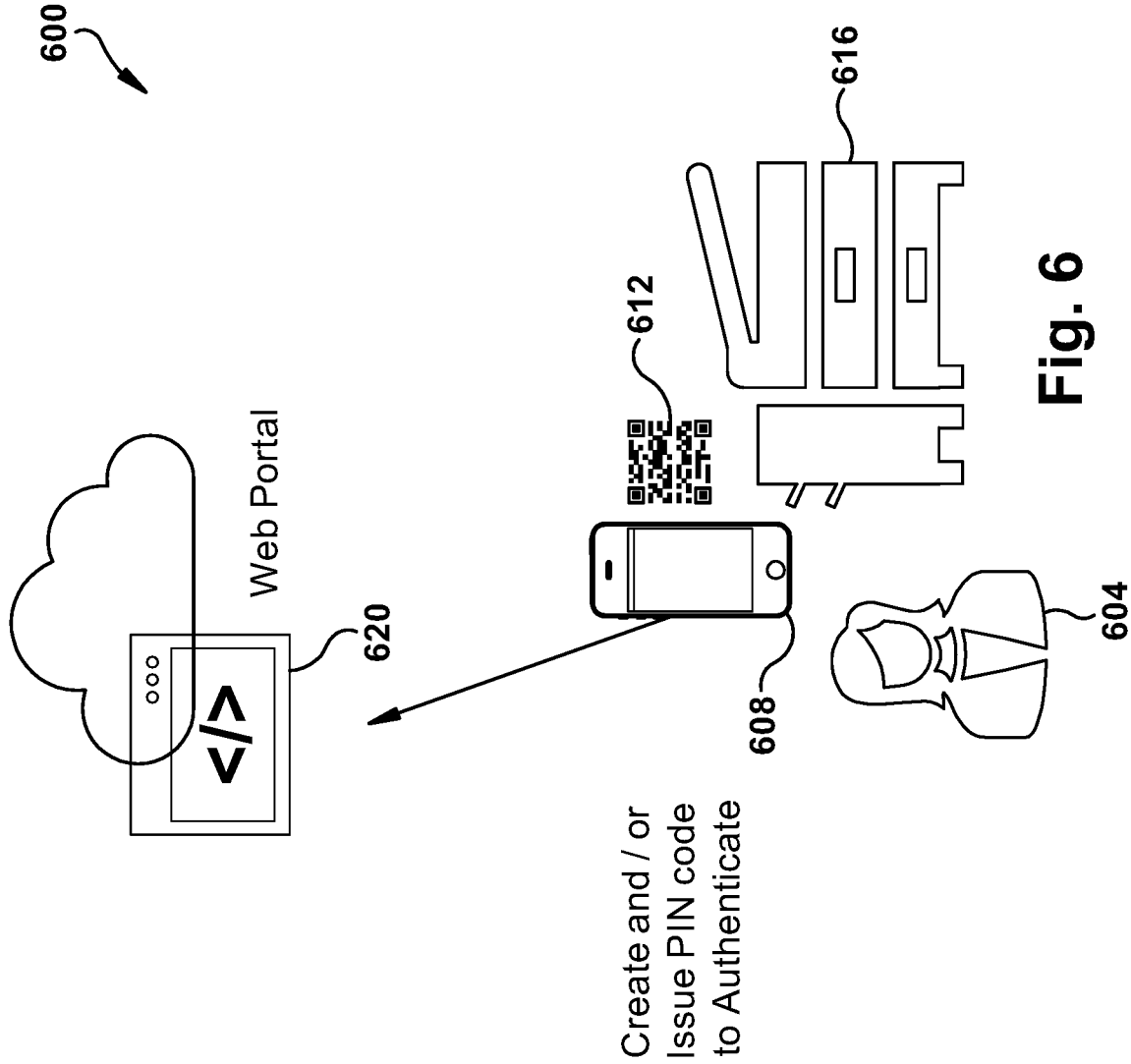
FIG. 6 is a flowchart of an example embodiment of a system for PIN authentication issuance from a MFP QR Code.

FIG. 6 is a system diagram 600 illustrating user 604 using their smartphone 608 to scan QR code 612 from MFP 616. Doing so launches SkyPrint Web Portal 620.

Figure 7:
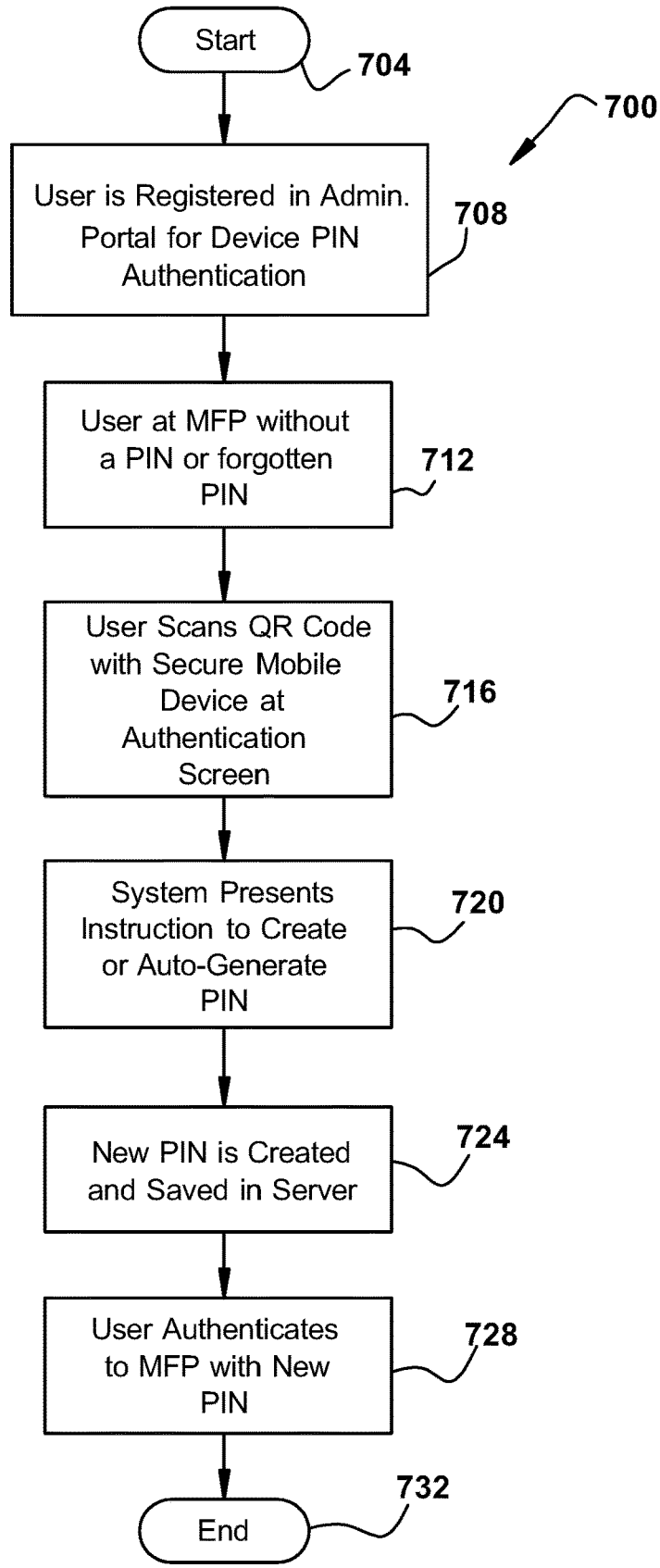
FIG. 7 is a flowchart of an example embodiment of a system for PIN authentication issuance from a MFP QR Code.

FIG. 7 is a flowchart 700 illustrating an example embodiment of a system for PIN authentication issuance from a MFP QR Code. The process begins at block 704 and proceeds to block 708 where a user is registered in a SkyPrint administration portal for device PIN authentication. Next, at block 712, a user arrives at an MFP without having a PIN or having forgotten their PIN. The user proceeds to scan an MFP QR code on the MFP device authentication screen with their secure mobile device at block 716. Next, the system presents an instruction to the user at block 720 to generate, or auto-generate a new PIN. A new PIN is then created and saved on the print server at block 724. The user is then able to authenticate to the MFP with their new PIN code in block 728 and the process ends at block 732.

Figure 8:
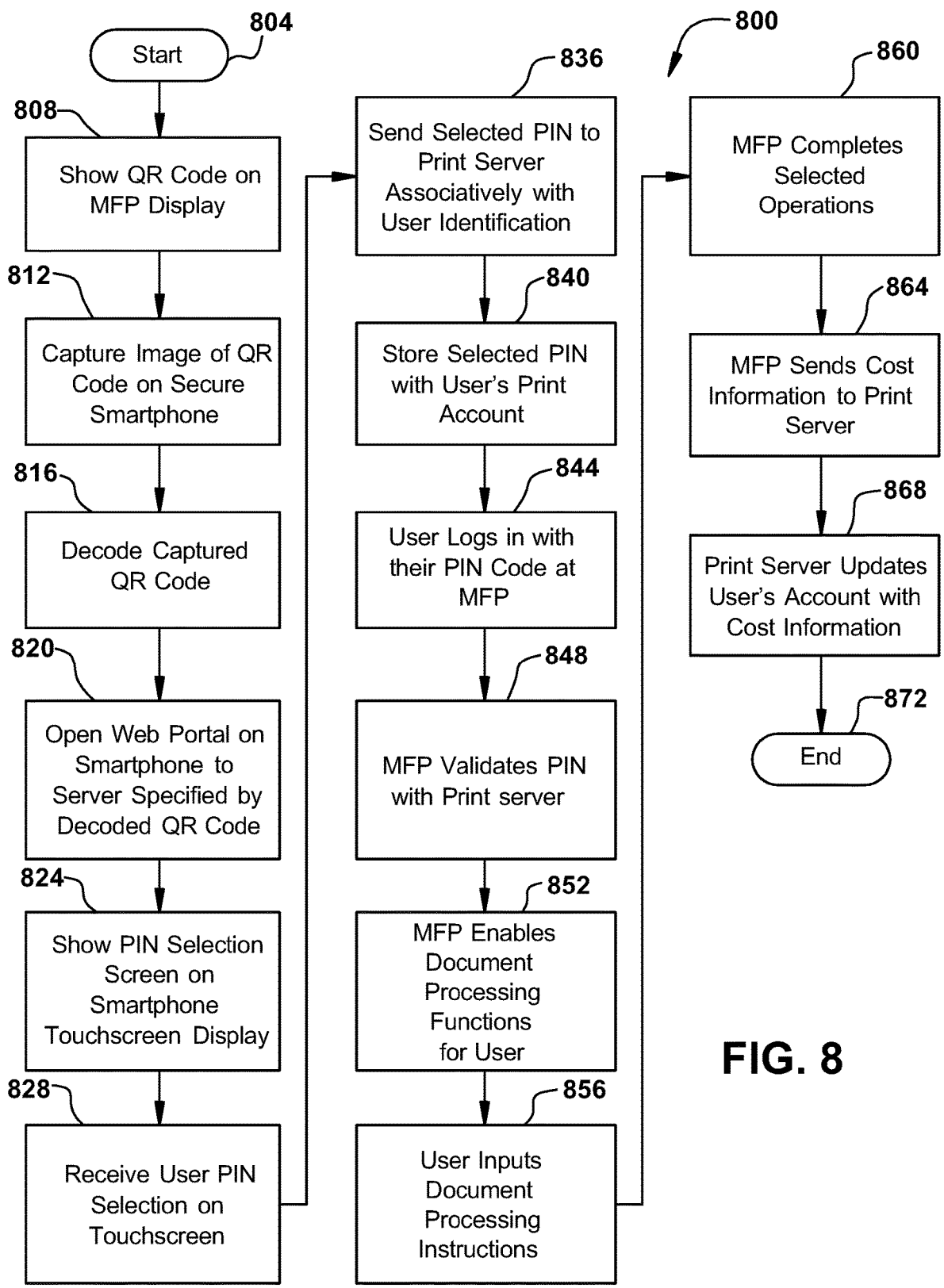
FIG. 8 is a flowchart illustrating example embodiment of a system for PIN authentication issuance from a MFP QR Code.

FIG. 8 is a flowchart 800 illustrating example embodiment of a system for PIN authentication issuance from a MFP QR Code. The system commences at block 804 and proceeds to block 808 wherein a QR code is shown on a MFP display. A user captures an image of the QR code on their secure smartphone at block 812 and the QR code is decoded at block 816. The decoded QR code opens a web portal to a specified server at block 820 and a PIN selection screen is generated on their smartphone display at block 824. The user enters their new PIN selection on their smartphone touchscreen at block 828. The new PIN is sent with an identification of the user to the server at block 836 and the server stores the information at block 840.

The user is then able to login to the MFP with their new PIN at block 844 and the PIN is verified at block 848. Such validation enables MFP operation for the user at block 852, and the user is able to submit document processing instructions to the MFP at block 856. The MFP completes the user selected operations at block 860 and sends corresponding cost information to the server at block 864. The server updates the user's account with the new cost information at block 868 and the process ends at block 872.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A portable personal data device comprising:
    a processor and associated memory;
    a touchscreen display;
    a network interface;
    the processor configured to authenticate the personal data device and associated user in accordance with one or more of a device password or biometric entry supplied by the user;
    a digital camera configured to capture an encoded image displayed on an associated multifunction peripheral;
    the processor configured to decode a captured encoded image;
    the processor further configured to open, for an authenticated personal device and associated user, a web portal to an associated administrative server, specified by a decoded image, via the network interface;
    the processor further configured to show a personal information number selection prompt generated by the administrative server on the touchscreen display via the web portal;
    the processor further configured to receive a personal information number selection from an associated user via the touchscreen display, responsive to the personal information number selection prompt, via the web portal; and
    the processor further configured to communicate a selected personal information number to the administrative server;
    wherein a multifunction peripheral is configured to receive the selected personal information number from the user via a multifunction peripheral user interface,
    wherein the multifunction peripheral is configured to authenticate the associated user with the administrative server in accordance the received personal information number,
    wherein functionality of the multifunction peripheral is enabled in accordance with authentication of the associated user by the administrative server.

2. The portable personal data device of claim 1 wherein the encoded image is comprised of a QR code.

3. The portable personal data device of claim 2 wherein the QR code is displayed on the multifunction peripheral user interface.

4. The system-portable personal data device of claim 3 wherein the QR code is displayed on the multifunction peripheral user interface concurrently with a number entry keypad, wherein the QR code is available in the event that a prior personal information number is unavailable to the user.

5. The portable personal data device of claim 4 wherein the user has no prior personal information number.

6. The portable personal data device of claim 4 wherein the user's prior personal information number is unavailable to the user.

7. A method comprising:
    capturing into memory of a portable personal data device, via a digital camera, an encoded image displayed on an associated multifunction peripheral;
    authenticating the personal data device and associated user in accordance with one or more of a device password or biometric supplied by the user;
    decoding, via a processor, a captured encoded image;
    opening, on a touchscreen display, a web portal to an associated administrative server, specified by a decoded image, via a network interface for an authenticated personal data device and associated user;
    showing a personal information number selection prompt, generated by the administrative server on the touchscreen display, via the web portal;
    receiving a personal information number selection from the associated user via the touchscreen display responsive to the personal information number selection prompt;
    communicating a selected personal information number to the administrative server;
    entering the selected personal information number into a multifunction peripheral user interface;
    authenticating the entered personal information number with the administrative server; and enabling functionality of the associated multifunction peripheral for a user in accordance with authenticating.

8. The method of claim 7 wherein the encoded image is comprised of a QR code.

9. The method of claim 8 further comprising displaying the QR code on the multifunction peripheral user interface.

10. The method of claim 9 further comprising displaying the QR code on the multifunction peripheral user interface concurrently with a number entry keypad, wherein the QR code is available in that event that a prior personal information number is unavailable to the user.

11. The method of claim 10 wherein the user has no prior personal information number.

12. The method of claim 10 wherein the user's prior personal information number is unavailable to the user.

13. A system comprising:
a print server having a print server processor, a print server memory and a print server network interface;
a secure portable data device associated with a user including a portable data device processor, a portable data device memory, a portable data device network interface, a portable data device digital camera and a portable data device touchscreen user interface;
the portable data device configured to authenticate with the user in accordance with one or more of a device password or a biometric supplied to the portable data device by the user;
a multifunction peripheral including a multifunction peripheral processor, a multifunction peripheral memory, a multifunction peripheral network interface, a multifunction peripheral touch screen user interface and a multifunction peripheral document processing engine;
the multifunction peripheral configured to display an encoded image;
the portable data device configured to capture a digital image of a displayed encoded image;
the portable data device further configured to decode a captured digital image;
the portable data device further configured to open, for an authenticated user, a portal to the print server in accordance with a decoded digital image;
the portable data device further configured to generate a personal information number prompt on the portable data device user interface corresponding to an opened portal to the print server;
the portable data device further configured to receive a personal information number selection from the user via the portable data device user interface;
the portable data device further configured to communicate a selected personal information number to the print server via the portable data device network interface;
the print server configured to receive the selected personal information number from the portable data device via the portable data device network interface;
the multifunction peripheral configured to receive the selected personal information number via the multifunction peripheral touch screen user interface;
the multifunction peripheral further configured to authenticate the received personal information number with the print server; and
the multifunction peripheral further configured to enable the document processing engine in accordance with authentication by the print server.

14. The system of claim 13 wherein the multifunction peripheral is further configured to:
receive a document processing instruction from via the multifunction peripheral user interface when the document processing engine is enabled; and
performing a document processing operation via the document processing engine in accordance with a received document processing instruction.

15. The system of claim 14 wherein the multifunction peripheral is further configured to communicate cost data associated with t a performed document processing operation and the user to the server via the print server network interface.

16. The system of claim 15 wherein the server is further configured to:
receive the cost data via the print server network interface; and
adjusting an account associated with the user in accordance with received cost data.

* * * * *